(12) United States Patent
Simon et al.

(10) Patent No.: US 6,362,330 B1
(45) Date of Patent: Mar. 26, 2002

(54) POLYSACCHARIDE-BASED THERMOPLASTIC MATERIAL, PROCESS FOR PREPARING THE SAME AND METHOD OF USE THEREOF

(75) Inventors: Joachim Simon, Düsseldorf; Hanns-Peter Müller, Odenthal; Dirk Jacques Dijkstra, Leverkusen; Gunter Weber, Fallingbostel, all of (DE)

(73) Assignee: Wolff Wolsrode AG, Walsrode (DE)

( * ) Notice: Subject to any disclaimer, the term of this patent is extended or adjusted under 35 U.S.C. 154(b) by 0 days.

(21) Appl. No.: 09/402,066

(22) PCT Filed: Mar. 25, 1998

(86) PCT No.: PCT/EP98/01744

§ 371 Date: Nov. 1, 1999

§ 102(e) Date: Nov. 1, 1999

(87) PCT Pub. No.: WO98/45334

PCT Pub. Date: Oct. 15, 1998

(30) Foreign Application Priority Data

Apr. 5, 1997 (DE) ......................................... 197 14 059

(51) Int. Cl.[7] .......................... B32B 23/08; C08G 63/91; C08B 3/00; C07H 3/00
(52) U.S. Cl. .............................. 536/30; 536/32; 536/37; 536/38; 536/56; 536/66; 536/124; 525/54.2; 428/508; 428/532
(58) Field of Search ............................. 536/30, 32, 37, 536/38, 56, 66, 124; 525/54.2; 428/508, 532

(56) References Cited

U.S. PATENT DOCUMENTS

| | | | |
|---|---|---|---|
| 395,028 A | | 12/1888 | Bailey et al. |
| 1,984,147 A | | 12/1934 | Malm .......................... 260/102 |
| 2,129,052 A | | 9/1938 | Fordyce ....................... 260/102 |
| 2,330,263 A | * | 9/1943 | Broderick .................... 260/226 |
| 2,748,109 A | * | 5/1956 | Allewelt ....................... 260/216 |
| 3,508,941 A | | 4/1970 | Johnson ........................ 106/125 |
| 4,097,666 A | | 6/1978 | Johnson et al. ................ 536/57 |
| 4,129,451 A | | 12/1978 | Menault et al. .............. 106/168 |
| 4,839,230 A | * | 6/1989 | Cook ........................ 428/423.1 |
| 5,466,794 A | | 11/1995 | Kalbe et al. ................... 536/66 |
| 5,478,386 A | | 12/1995 | Itoh et al. .................... 106/169 |
| 5,861,506 A | * | 1/1999 | Simon et al. .................. 536/66 |

FOREIGN PATENT DOCUMENTS

| | | |
|---|---|---|
| CA | 2134635 | 5/1995 |
| CA | 2201807 | 10/1997 |
| DE | 2358808 | 6/1975 |
| GB | 467992 | 6/1937 |

OTHER PUBLICATIONS

Macromolecules 18, (month unavailable) 1985, pp. 1746–1752, Laivins et al "Characterization and Chain Stiffness of (Acetoxypropyl)cellulose".
J. Appl. Polym. Sci, vol. 52 (month unavailable) 1994, pp. 755–761, Wang, et al "Synthesis and Characterization of Long–Chain Fatty Acid Cellulose Ester (FACE)".
J. Env. Polym. Degr, vol. 3, No. 2, (month unavailable), 1995, pp. 115–119, Wang et al "Synthesis of Cellulose–Fatty Acid Esters for Use as Biodegradable Plastics".
Acta Polymerica 32, (month unavailable), 1981, pp. 172–176, Reichelt et al "Über die Umsetzung von Cellulose und Lignin mit Isocyanaten Bbw. Isocyanatgruppenhaltigen Präpolymeren" (Abstract).
British Polymer Journal, vol. 18, No. 4, (month unavailable), 1986, pp. 259–262, Banks et al "Mechanical Properties of Alkyl Isocyanate Modified Scots Pine Wood Surfaces".
Cel. Chem. Technol, 1, (month unavailable), 1967, pp. 23–32, Schurz et al "Cellulose–Pfropfmischpolymerisation Mit Polyurethan" (Abstract).
Polymer News, vol. 15 (month unavailable), 1990, pp. 170–175, Philipp, "Organic Solvents for Cellulose".
J. Appl. Polym. Sci., vol. 22, (month unavailable), 1978, pp. 1243–1253, Lokhande, "Swelling Behavior of Cotton Fibers in Morpholine and Piperidine".
Polymer, vol. 31, Feb., 1990, pp. 348–352, Lavrenko et al, "Conformation of Carboxymethylcellulose in Cadoxen–Water Solutions".
J. Appl. Pol. Sci., vol. 27, (month unavailable), 1982, pp. 673–685, Miyagi et al "Carbanilation of Cellulose in the Paraformaldehyde–Dimethyl Sulfoxide Solvent System".
J. Appl. Pol. Sci, vol. 42, (month unavailable), 1991, pp. 821–827, Evans et al, "Pyridine–Catalyzed Depolymerization of Cellulose during Carbanilation with Phenylisocyanate in Dimethylsulfoxide".
Eur. Polym. J., vol. 26, No. 11 (month unavailable), 1990 pp. 1217–1220, Wallis et al "Side Reactions Of Phenylisocyanate During Amine–Catalysed Carbanilation of Cellulose".
J. Macromol. Sci. Chem, A16(2), (month unavailable), 1981, pp. 473–479, Penn et al, "Biodegradable Cellulose Graft Copolymers. I. Condensation Type Graft Reactions".
Polym. Prepr. Am. Chem. Soc. Div. Poly. Chem, 20, (month unavailable), 1979, pp. 574–577, Penn et al, "Biodegradable Cellulose Graft Copolymers. I. Condensation Type Graft Reactions".
J. Poly. Sci. Polym. Lett. Ed. vol. 11, (month unavailable), 1973, pp. 731–735, Kim et al "A New Class of Biodegradable Polymers".
Macromol. Synth. vol. 7, (date unavailable), pp. 101–105, Kim et al. "Copolymers of Depolymerized Cellulose Triacetate and Diisocyanates".
Polymer, vol. 21, Jun., 1980, pp. 648–650, Amick et al, "Preparation and Water Sorption Properties of Cellulose––Polypropylene Glycol Block Copolymers".
Polym. Prepr. Am. Chem. Soc. Div. Poly. Chem., 3, (month unavailable), 1990, pp. 642–643 Caron et al, "Cellulose Triacetate/Polycaprolactone Block Copolymers".

* cited by examiner

*Primary Examiner*—Kathleen Kalher Fonda
*Assistant Examiner*—Leigh C. Maier
(74) *Attorney, Agent, or Firm*—Joseph C. Gil; Aron Preis; James R. Franks

(57) ABSTRACT

The present invention relates to novel thermoplastic materials based on polysaccharide ethers which are simultaneously substituted by carboxylic acid ester groups and carbamate groups, together with mixtures of such derivatives with low molecular weight aliphatic urea derivatives.

7 Claims, No Drawings

POLYSACCHARIDE-BASED THERMOPLASTIC MATERIAL, PROCESS FOR PREPARING THE SAME AND METHOD OF USE THEREOF

The present invention relates to novel thermoplastic materials based on polysaccharide ethers which are simultaneously substituted by carboxylic acid ester groups and carbamate groups, together with mixtures of such derivatives with low molecular weight aliphatic urea derivatives.

The invention additionally relates to the production of such derivatives and mixtures of polysaccharide ethers and aliphatic or aromatic carboxylic acids or carboxylic acid derivatives and aliphatic monoisocyanates in a suitable solvent. After removal of the solvents, the materials according to the invention are preferably processed as thermoplastic materials by injection moulding or extrusion. Moulded articles, fibres, films and also foams or coatings may be produced.

It is known that melt processable materials may be produced from polysaccharides, in particular from starches or celluloses, by esterification or etherification of the free hydroxyl groups when the reaction is performed homogeneously (cf Encyclopedia of Polymer Science and Technology Vol. 3, 1985).

Thermoplastic materials are also obtained, for example according to EP 626 392, by esterification of polysaccharide hydroxyalkyl ethers.

JP 142938 and Macromolecules 18, 1985, 1746–1752 describe the reaction of cellulose ethers with acid chlorides or with carboxylic acid anhydrides.

J. Appl. Polym. Sci. 52, 1994, 755–761 and J. Env. Polym. Degr. 3, 1995, 115–118 describe the production of thermoplastic cellulose esters from cellulose and long chain unsaturated fatty acid esters in pyridine/DMF.

The melt processability of polysaccharide derivatives is dependent on the average degree of substitution of the anhydroglucose repeat unit, abbreviated below as DS, which may amount for example to at least approximately 2.0 in the case of thermoplastic aliphatic cellulose ester derivatives.

For melt processing, auxiliary substances, in particular plasticisers, which reduce the viscosity of the material to be softened, have to be added to these polysaccharide derivatives (F. Muller, Ch. Leuschke in Becker/Braun Kunststoff-Handbuch Vol. 3/1, Hanser Verlag Munich 1992). At elevated temperatures >220° C., it is possible to observe decomposition and discolouration of polysaccharide derivatives.

While etherification is conventionally carried out by reacting alkali cellulose with epoxides, such as for example ethylene oxide or propylene oxide, in an inert suspending agent, esterification is conventionally carried out in a solution process using acids as the solvent. In such an instance, the swelling process also serves to activate the cellulose (Encyclopedia of Polymer Science and Technology Vol. 3, 1985).

Synthesis of the known polysaccharide carboxylic and dicarboxylic acid half esters is effected in pyridine or acetic acid with basic salts such as for example sodium acetate as the catalyst (J. Env. Pol. Degr. 3, 1995, 115–119). The products may be liberated from these solvents only with considerable effort. Because they accelerate corrosion, these solvents require specially designed installations for synthesis thereof. Syntheses carried out in standard organic solvents would be advantageous in this respect.

Economic derivatisation of celluloses using acid derivatives with a degree of substitution <<3 and homogeneous random distribution of the acid derivatives has hitherto required complete substitution of the cellulose (DS approx. 3.0) with subsequent partial hydrolysis (U.S. Pat. No. 1,984, 147, U.S. Pat. No. 2,129,052, U.S. Pat. No. 5,478,386).

Thermoplastic cellulose derivatives with DS <3.0 and homogeneous random substituent distribution have not hitherto been economically directly available. This is primarily because of the poor, incomplete solubility of partially substituted celluloses in suitable organic solvents.

Likewise, it is possible to achieve uniform reaction of polysaccharides with substituted isocyanates or substituted isothiocyanates only in the case of good accessibility of the cellulose chains in homogeneous solution or in solvents with a very strong swelling action.

Acta Polymerica 32, 1981, 172–176 describes how dry cellulose reacts in an unsatisfactory manner with isocyanates in the absence of solvents and other catalysts. Reactions in solvents which are not in a position at least to initiate swelling of the cellulose do not produce satisfactory reactions with the cellulose (Ang. Chem., 59, 1947, 257–288).

B. Polym. J., 18, 1986, 259–262 describes the reaction of lignocellulose with alkyl monoisocyanates. Urethane formation remains restricted to the surface of the polysaccharide fibres.

DE 23 58 808 describes the reaction with long chain mono- and diisocyanates restricted to the surface of cellulose powder.

In "Neueste Fortschritte und Verfahren in der chemischen Technologie der Textilfasern", Birkhäuser Verlag, Stuttgart, 1957, L. Disserens provides a summary of the reactions, restricted to the surface, of textile fibres mono- and diisocyanates. In this context, long chain alkyl isocyanates are preferably used for the purpose of hydrophobising textile material. GB 467 992 describes the heterogeneous reaction with isocyanates of textile fibres previously reacted with alkylene oxides. In the case of the reaction carried out in benzin, however, no significant swelling of the cellulose occurs.

Average degrees of conversion of cellulose with isocyanates are obtained, with solvents and catalysts, in particular when the cellulose is initially present in a swollen state. This may be achieved by using a suitable solvent or by using a derivative of cellulose or a polysaccharide together with a suitable solvent. Formation of the urethane bond may also be effected by a subsequent baking process (Cell. Chem. Technol. 1, 1967, 23–32).

Swelling of the cellulose may be achieved by initiating said swelling in water, which is subsequently replaced by a polar aprotic solvent.

Alternatively, direct use may also be made of solvents with a strong swelling or dissolving action in relation to cellulose, such as DMAc, DMSO, DMAc/LiCl or DMSO/formaldehyde mixtures (U.S. Pat. No. 4,129,451, U.S. Pat. No. 4,129,640, U.S. Pat. No. 4,097,666). Solvent systems are summarised in Nevell and Zeronian: Cellulose chemistry and its applications, Wiley, N.Y. 1985, Acta. Polym. 36 (1985), 697–698 and Polymer news 15, (1990), 170–175.

Examples of other systems described as having a good swelling or dissolving action are, for example, morpholine/piperidine mixtures (J. Appl. Polym. Sci., 22, (1978), 1243–1253) together with amine-N-oxides (Acta Polymerica, 39, (1998), 710–714, U.S. Pat. No. 3,508,941) and metal cation/solvent systems such as Cu/NH3 or Cd/ethylene diamine (Polymer 31, (1990), 348–352).

The reaction of phenyl isocyanate with cellulose in DMSO/paraformaldehyde mixtures is described in J. Appl. Pol. Sci. 27, (1982), 673–685, J. Appl. Pol. Sci. 42, (1991), 821–827 and in Nevell and Zeronian: Cellulose chemistry and its applications, Wiley, N.Y. 1985.

High degrees of conversion are promoted, in particular, by the addition of catalysts, by a correspondingly long reaction period or by elevated temperature. On the other hand, where DMAc, DMSO or DMF is used as a swelling agent or solvent, the formation of isocyanurates is catalysed with amines (Eur. Polym. J., 26 (11)(1990) 1217–1220).

The patents and publications listed below describe the reaction of soluble cellulose acetate with degrees of substitution DS<3.0 with isocyanates, isocyanate prepolymers or isocyanate-functionalised polymers or oligomers in homogeneous solution. After formation of the urethane, the acetate groups may be saponified and urethane derivatives of the unsubstituted cellulose may be isolated:

J. Macromol. Sci. Chem A 16 (1981) 473, Polym. Prepr. Am. Chem. Soc. Div. Poly. Chem. 20 (1979) 574. J.Poly. Sci. Polym.Lett.ed. 111(12) (1973) 731–735, Macromol. Synth. 7 101–105, Polymer 21 (1980) 648–650, Polym. Prepr. Am. Chem. Soc. Div. Poly. Chem.3 (1990) 642, U.S. Pat. No. 395,028).

The reaction of polysaccharide derivatives with aliphatic isocyanates to form thermoplastic materials is described in DE 19 613 990. However, the economic viability of the process requires improvement.

Polysaccharide ethers which have been modified simultaneously by carbamate and ester groups and may thereby be melt processed are not described.

DE 43 38 152 describes the production of aliphatic carbamates from starch and starch acetates. Starch ethers are not described in this connection. In comparison with cellulose derivatives, starch derivatives exhibit only inadequate mechanical properties. Moreover, in comparison with cellulose, starch requires fundamentally different synthesis conditions in suitable organic solvents, such that knowledge acquired in relation to starch derivatives cannot be applied to cellulose derivatives or can only be applied thereto to a limited extent.

The object of the invention is to achieve economic reaction conditions for the reaction of polysaccharide ethers, particularly preferably those from cellulose, with isocyanates and carboxylic acids or carboxylic acid derivatives, such that low to high degrees of conversion are obtained and melt processing is possible.

For this purpose, it was hitherto necessary, in particular, to carry out the reaction under homogeneous conditions, i.e. by dissolution of the polysaccharide derivative in solvents.

It has surprisingly been found that polysaccharide ethers, and particularly preferably cellulose alkyl ethers which are initially neither soluble nor readily swellable in the solvents used according to the invention, are dissolved or begin to swell markedly during the reaction with alkyl monoisocyanates and that, directly subsequent to the reaction with the alkyl isocyanates, esterification with aromatic or aliphatic mono- or dicarboxylic acids may occur, which alternatively produces low to high degrees of conversion and results in homogeneous random distribution of the ester and carbamate groups along the main cellulose chain.

Furthermore, it has surprisingly been found that the main products X of this process according to the invention may be melt processable and in particular the by-products Y of the process according to the invention improve the melt processability of the products according to the invention.

In addition, it has surprisingly been found that, in contrast to the above-described prior art, melt processing of the derivatives according to the invention is also possible at low degrees of substitution<DS=2.0 and, moreover, does not necessarily require the addition of a plasticiser, since the viscosity of the softened material is sufficiently low for melt processing. The addition of plasticisers is possible nonetheless and improves the mechanical properties of the material processed.

The present invention relates to uniformly substituted polysaccharide derivatives of the general structure polysaccharide-O-R in which polysaccharide-O represents a substituted or unsubstituted polysaccharide unit and R is a substituent of a polysaccharide-OH group having either the structure

or the structure

or the structure

or the structure

in which A is a linear polyether chain of the following structure:

in which D denotes a linear aliphatic branched or unbranched chain of 2 to 12 C atoms, O represents an oxygen atom and n is a number equal to or greater than 1, and B represents a substituted carbamic acid of the structure

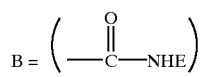

in which E denotes a linear or branched aliphatic chain of 1 to 18 C atoms,

C represents a carboxylic acid ester of the structure

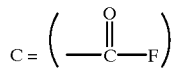

in which F denotes a linear aliphatic, saturated or unsaturated, branched or unbranched chain of 2 to 22 C atoms.

This surprising result of the procedure according to the invention was not foreseeable for the person skilled in the art. The person skilled in the art would have expected it to be necessary to achieve a high overall degree of substitution for melt processing and a homogeneous random substituent distribution, and that for this purpose a homogeneous reaction in solution and optionally the addition of a plasticiser would be necessary.

The combination of substituents in particular, together with the process according to the invention, produce the surprising result, however. In addition, it would have been expected that the by-products Y would decompose during subsequent melt processing and form troublesome gaseous decomposition products.

The new compounds A correspond to the general structure polysaccharide-O-R in which polysaccharide-O represents a repeat unit of a polysaccharide or polysaccharide ether and R is a substituent group, which is bonded to the polysaccharide derivative via an oxygen atom.

These substituents R consist of a random mixture of at least 2 or more substituents with homogeneous distribution along the main polysaccharide chain. The substituent mixture may consist of unbranched or branched, aliphatic or aromatic mono- or dicarboxylic acid ester groups and of unbranched or branched aliphatic carbamate groups.

The molar ratio of the components X and the by-products Y is represented by the formula $$0.001 < Y/(X+Y) < 0.3.$$

It is particularly preferred for the molar ratio $Y/(X+Y)$ to amount to at least 0.01, in particular 0.05–0.1. If the limit value of 0.3 is exceeded in the above formula, i.e. if the proportion of the by-products is increased, the product no longer exhibits the mechanical properties necessary for practical application.

The function according to the invention of the by-product Y is only obtained if the melt temperature of Y is lower than the processing temperature.

The invention thus provides melt processable polysaccharide ether/ester/carbamate derivatives, characterised in that they may be produced from polysaccharides, wherein firstly polysaccharide ethers are produced by etherification, which polysaccharide ethers are then reacted with isocyanates, optionally in blocked form, and carboxylic acid derivatives to form polysaccharide ether/carbamate/ester derivatives.

In a preferred embodiment, first of all cellulose ethers with average degrees of substitution MS per anhydroglucose unit MS=0–5, preferably 0.1 to 5, particularly preferably 0.4–1.5, are produced or used, wherein the average degree of substitution is dependent on ether substituents and may be >3.0 in the case of further functionalisable ether groups such as, for example, hydroxypropyl ethers of cellulose but may amount only to a maximum of MS=3.0 in the case of cellulose ether groups which may not be further functionalised, such as for example methylcellulose.

In a further preferred embodiment, the average overall degree of substitution, based on the sum of ester and carbamate substituents, relative to the anhydroglucose unit, amounts to DS=0.3–3.0, preferably 0.6 to 2.8, particularly preferably 0.5–2.5, wherein the proportion of carbamate substituents in the DS=0.3–3.0 amounts to at least 0.2, preferably 0.3–1.0.

The invention also relates to the mixture of the polysaccharide ether/ester/carbamate derivatives according to the invention with low molecular weight unbranched or branched, symmetrical or asymmetrical, aliphatic dialkyl urea derivatives with chain lengths of from 1–20 carbon atoms.

In a preferred embodiment, the molar ratio of the polysaccharide ether/ester/carbamate derivatives X according to the invention and the dialkyl urea derivatives Y is represented by the formula $0.01 < Y/(X+Y) > 0.3$. The molar ratio $Y/(X+Y)$ particularly preferably amounts to at least 0.01, very particularly preferably to 0.05–0.1.

The invention further relates to a process for producing such polysaccharide ether ester carbamates according to the invention together with mixtures thereof with low molecular weight urea derivatives, said process being characterised in that first of all the polysaccharide ether is produced, this then being added to a non-solvent with a suitable catalyst and then converted, using an isocyanate, into the corresponding carbamate, wherein the polysaccharide ether carbamates thus obtained, which optionally contain low molecular weight urea derivatives, are soluble or swell markedly in the solvent or suspending agent used and are subsequently esterified by the addition of suitable activated derivatives of carboxylic acids and may then be isolated by precipitation, evaporation of the solvents or devolatilising extrusion.

In a preferred embodiment, the average overall degree of substitution based on the sum of ester and carbamate substituents relative to the anhydroglucose unit amounts to DS=0.3–3.0, particularly preferably 0.5–2.5.

In a further preferred embodiment, the molar ratio of the dialkyl urea derivatives arising during carbamate formation is represented according to the invention by the formula $0.01 < Y/(X+Y) < 0.3$ (molar amount of polysaccharide ether/ester/carbamate derivatives=X and molar amount of dialkyl urea derivatives=Y). The molar ratio $Y/(X+Y)$ particularly preferably amounts to at least 0.01, very particularly preferably to 0.05–0.1.

In a preferred embodiment, mono- or difunctional carboxylic acid chlorides, anhydrides or activated esters thereof are used as the activated aliphatic or aromatic carboxylic acid derivatives. Aliphatic carboxylic acid anhydrides are particularly preferable.

The polysaccharide ether ester carbamates according to the invention may optionally be provided with conventional additives such as, for example, plasticisers, impact resistance modifiers, flame retardants, anti-oxidants, UV protectors, hydrophobising agents, nucleating agents and/or other agents, together with fillers.

The invention also provides use of the melt processable polysaccharide ether/ester/carbamate derivatives according to the invention as a thermoplastic material for the production of injection moulded articles, for extrusion, for blow moulding of for example bottles/plant pots and other blow mouldings and for the production of films, fibres, foams and coatings.

Processing of the materials according to the invention is effected in conventional plastics processing machines such as for example injection moulding machines or extruders. In such instances, temperatures of from 80–220, preferably 100–200° C. are used.

For the purpose of synthesis, the polysaccharide is optionally activated using alkali metal hydroxide solution or ammonium salts, but may also be activated hydrothermally, using liquid ammonia and/or by ultrasound. The activated polysaccharide may be isolated or subjected directly to further processing. Before the etherification reaction is begun, optionally present water or solvents is/are removed by solvent scouring or by distillation, and the polysaccharide ether is produced by the addition of epoxide. Etherification is also possible in the presence of aqueous alkali metal hydroxide solution.

For further synthesis, an extensively water-free polysaccharide ether (water content <5 wt. %), preferably a cellulose ether such as for example hydroxypropyl- or hydroxyethylcellulose, is refluxed in a suspending agent, the isocyanate compound being added dropwise after the addition of a catalyst. The isocyanate reacts with the polysaccharide ether in a solid/liquid two-phase reaction in standard suspending agents. In suspending agents such as dioxane and toluene, the reaction products become dissolved during the reaction. This surprising homogenisation of the reaction solution ensures that reaction with further derivatives may occur in simplified manner. Surprisingly, it is possible in this way also to obtain homogeneously derivatised polysaccharide ether carbamate esters having a low degree of substitution, which may thus be obtained without the need for full substitution and subsequent hydrolysis.

The overall degree of substitution is composed of the individual degrees of substitution for carbamate and carboxylic acid ester and amounts at most to 3 if further functionalisable ether groups are present, such as for example in hydroxypropyl ethers of the polysaccharides. In the case of cellulose ether groups which cannot be further functionalised, such as for example in methylcellulose, the maximum DS possible is reduced by the average degree of substitution MS of the polysaccharide ether used.

Isolation of the product may be effected, in the process according to the invention, by means of, for example precipitation, evaporation of the solvent or devolatilising extrusion.

The stoichiometry and the progress of the reaction may be used to adjust within broad margins the degree of conversion of the polysaccharide derivative, together with the proportion thereof consisting of carbamate and ester groups. For melt processability of the material, an overall degree of substitution of over 1.0 is sufficient.

Polysaccharides and polysaccharide derivatives may, at normal pressure and room temperature, contain a low proportion by weight of water. The secondary reaction of the isocyanate compounds with water results in the formation of by-products preferably including di- substituted ureas. The extent to which by-products are formed largely depends on the water content of the reaction solution. These by-products exhibit melting temperatures <200° C. and result, provided that they are not removed during working up of the polysaccharide derivatives, in a marked improvement in the melt processability of the product.

In a further stage, during esterification according to the invention of the polysaccharide derivatives with dicarboxylic acid esters, the carboxyl group, which is still free, of the dicarboxylic acid monoester thus obtained may be reacted with alkylene oxides. The proportions may be such that the free carboxylic acids are completely or only partially reacted with alkylene oxide. Likewise, the free acid groups may serve as initiators for polymeric ether synthesis.

If amine was used for activation, it serves as a catalyst during this reaction stage too. Small amounts of amine may accordingly be added at this point in the event of alkali activation.

For the purpose of synthesis, industrially obtainable polysaccharides of any molecular weight, such as for example native and soluble starch of any provenance, amylose, amylopectin, alginic acids and alginates, carrageenan, chitin, chitosan, dextran, glycogen, guar gum, carob flour, laevosan, pectin, pullulan, xanthan gum and xylan are suitable. Cellulose is particularly preferred.

If polysaccharide ethers, in particular cellulose ethers, are put to direct use, suitable cellulose ethers are methylcellulose, ethylcellulose or benzylcellulose with average degrees of substitution lower than or equal to 2.5, hydroxyethylcellulose, hydroxypropylcellulose, di-hydroxypropylcellulose, hydroxybutylcellulose, methylhydroxyethylcellulose, methylhydroxypropylcellulose, methylhydroxybutylcellulose, ethylhydroxypropylcellulose, ethylhydroxyethylcellulose, carboxyalkylcellulose, sulfoalkylcellulose, cyanoethylcellulose and mixed ethers thereof. Ethers of the above-mentioned polysaccharides may also be used as the polysaccharide component.

Suitable suspending agents or solvents are ketones such as for example methylethyl ketone, ethers and cyclic ethers such as for example dimethoxyethane, dimethoxymethane, dimethyl ether, diethylene glycol dimethyl ether, dioxane and tetrahydrofuran, acetals, hydrocarbons and polar aprotic compounds such as dimethyl sulfoxide, dimethyl formamide, dimethyl acetamide, N-methyl morpholine, N-methyl pyrrolidone, trialkyl phosphate, ethyl acetate and non-polar aprotic solvents such as toluene. Dioxane and toluene are preferred.

Suitable isocyanate compounds include aliphatic linear and branched monoisocyanates with a saturated or unsaturated alkyl chain such as for example methyl isocyanate, ethyl isocyanate, propyl isocyanate, isopropyl isocyanate, butyl isocyanate, pentyl isocyanate, hexyl isocyanate, heptyl isocyanate, octyl isocyanate, nonyl isocyanate, decyl isocyanate, undecyl isocyanate, dodecyl isocyanate, tetradecyl isocyanate, hexadecyl isocyanate, octadecyl isocyanate, the corresponding isothiocyanates together with any mixtures of the above-mentioned monoisocyanates and isothiocyanates.

Suitable catalysts for the reaction are amines, in particular stearically inhibited tertiary organic amines such as trimethylamine, triethylamine, tributylamine, tetramethylene diamine, pyridine, N,N-dimethylcyclohexyl diamine, N,N-dimethylbenzylamine, 4-pyrilidinopyridine, permethyl diethylene triamine, 1,4-diazabicyclo[2.2.2]-octane, 1,8-diazabicyclo[5.4.0]undec-7-ene, 1,5-diazabicyclo[4.3.0] non-5-ene together with any mixtures thereof.

Catalysts conventional in polyurethane chemistry are also suitable, such as for example organotin compounds.

During catalysis, the amount of amine to be used has an effect on the degree of derivatisation of the polysaccharide. For reaction with the polysaccharide derivative, the amine is used in a molar ratio to the polysaccharide of 0.01 to 3, preferably 0.1 to 1.

For formation of the ester substituents according to the invention of the polysaccharide derivatives, it is possible to use substituted or unsubstituted, aliphatic or aromatic, branched or unbranched carboxylic acid derivatives, such as for example the corresponding acid chlorides or anhydrides. It is preferable to use the carboxylic acid anhydrides such as for example acetic anhydride, propionic anhydride, isobutyric anhydride, butyric anhydride, trimethyl acetic anhydride, valeric anhydride, hexanoic anhydride, nonanoic anhydride and mixtures thereof. Of these, acetic anhydride, propionic anhydride, isobutyric anhydride and butyric anhydride are particularly preferred.

Suitable dicarboxylic acid anhydrides are anhydrides of substituted or unsubstituted, aliphatic or aromatic, branched or unbranched dicarboxylic acid derivatives, preferably their acid chlorides or anhydrides. Use is particularly preferably made of phthalic anhydride, tetrahydrophthalic anhydride, hexahydrophthalic anhydride, maleic anhydride, succinic anhydride, trimellitic anhydride and isatoic anhydride. Also suitable are alkane and alkenyl succinic anhydrides such as hexyl, hexenyl, octyl, octenyl, nonyl, nonenyl, decyl, decenyl, dodecyl, dodecenyl, tetradecyl, tetradecenyl, hexadecyl, hexadecenyl, octadecyl, octadecenyl, isooctadecyl, isooctadecenyl, eicosyl and docosyl succinic anhydride.

Suitable epoxides are preferably monoepoxides such as ethylene oxide, propylene oxide, 1,2-epoxybutane, 1,2-epoxyhexane, 1,2-epoxyoctane, 1,2-epoxydecane, 1,2-epoxydodecane, 1,2-epoxyhexadecane, 1,2-epoxyoctadecane, stearic acid glycidyl ether, epoxybutyl stearate, lauryl glycidyl ether, glycidyl methyl ether, glycidyl ethyl ether, glycidyl propyl ether, glycidyl butyl ether, glycidyl tertiary butyl ether, glycidyl acrylate, glycidyl methacrylate, allyl glycidyl ether, butadiene monoxide, glycidol, 3-glycidoxypropyl trimethoxysilane, 3-glycidoxypropyl triethoxysilane, di-N-butylamino-2,3-epoxypropane, diethyl-β,γ-epoxypropyl phosphate, 4-(2,3-epoxypropyl) morpholine, styrene oxide and phenoxypropylene oxide.

The reaction temperature of the polysaccharide derivatives with the isocyanates and carboxylic acid derivatives amounts to from 20 to 150° C., preferably 40–130° C., particularly preferably 60–120° C. The reaction times amount to from 0.5 to 16 hours, preferably 0.5 to 9 hours.

The polysaccharide ester carbamates obtainable by the process according to the invention may be melt processed after removal of the solvents and converted, by conventional processing methods such as extrusion, into injection mouldings, films or fibres for example.

The process according to the invention is further characterised in that by-products, particularly preferably dialkyl ureas, are formed during the reaction, depending on the water content of the polysaccharide component. The presence of these by-products in the product improves the melt processability of the cellulose ether urethane derivatives.

The polysaccharide derivatives according to the invention and mixtures thereof with low molecular weight urea derivatives are suitable for the production of coatings, fibres, powders, films, foams and moulded articles. Their properties may be varied by producing blends of any composition with other components, such as polysaccharides and polysaccharide derivatives or polyurethanes for example. They may also be combined-with plasticisers, flame retardants, pigments and auxiliary processing substances such as for example long chain fatty acid amides. In particular, the addition of plasticisers such as for example triethylene glycol, aliphatic esters of phthalic acid, adipic acid, azelaic acid, sebacic acid and phosphoric acid, such as for example dimethyl phthalate, dibutyl phthalate, dibutyl adipate, dioctyl adipate, dibutyl acetate, trichloroethyl phosphate, trichloropropyl phosphate and tributyl phosphate together with lactic acid esters or tartaric acid esters or mixtures of the above-mentioned plasticisers improves melt processability and enables processing even at low degrees of substitution such as for example DS=0.5–1.0.

The melt processable moulding compositions according to the invention may additionally contain additives capable, for example, of colouring or pigmenting the polymer mixtures, improving their oxidation or light resistance or reducing their inflammability.

The subject matter of the present invention will be described in more detail with the aid of the Examples provided.

EXAMPLES ACCORDING TO THE INVENTION

Cellulose ethers used according to the invention, such as for example the hydroxypropylcellulose (HPC) used in the following Examples, may be obtained by industrial processes such as are described in, for example, Encyclopedia of polymer science and engineering, Vol 3, 1985, Wiley N.Y. The HPC used in the Examples is distinguished by MS values of 0.4–4.5 at a molecular weight (number average) ranging from 10,000–200,000. HPCs having MS=0.9, Mw approx. 200,000 were preferably used.

Example 1

5.3 g (0.025 mol) of dried hydroxypropylcellulose is refluxed in 200 g dioxane with 0.0125 mol DBU for 30 minutes. The isocyanate is then added dropwise and the mixture is stirred with refluxing for two hours. Thereafter, phthalic anhydride, dissolved in 50 g dioxane, is added dropwise and the mixture is stirred with refluxing for three hours. 0.025 mol of propylene oxide is then added dropwise and the mixture is stirred with refluxing for 13 hours. The product is precipitated from acetone, washed with acetone and dried in a vacuum. In the table below, the amounts used, the yield and the softening temperature of the product are indicated.

| n-stearyl isocyanate g/mol | Phthalic anhydride g/mol | Propylene oxide g/mol | Yield (g) | ST (° C.) |
|---|---|---|---|---|
| 7.3/0.025 | 7.4/0.05 | 5.8/0.1 | 15.5 | 170 |

Example 2

5.3 g (0.025 mol) of dried hydroxypropylcellulose MS 0.9 is refluxed in 200 g dioxane with 0.0125 triethylamine for 30 minutes. The isocyanate is then added dropwise and the mixture is stirred with refluxing for two hours. Thereafter, phthalic anhydride, dissolved in 50 g dioxane, is added dropwise and the mixture is stirred with refluxing for three hours. Acetic anhydride is then added dropwise and the mixture is stirred with refluxing for 13 hours. The product is precipitated from acetone, washed with acetone and dried in a vacuum. In the table below, the amounts used, the yield and the softening temperature of the product are indicated.

| n-stearyl isocyanate g/mol | Phthalic anhydride g/mol | Acetic anhydride g/mol | Yield (g) | ST (° C.) |
|---|---|---|---|---|
| 7.3/0.025 | 74/0.05 | 5.1/0.05 | 11.4 | 180 |

Example 3

5.3 g (0.025 mol) of dried hydroxypropylcellulose MS 0.9 is refluxed in 200 g dioxane with 0.0125 triethylamine for 30 minutes. The isocyanate is then added dropwise and the mixture is stirred with refluxing for two hours. Thereafter, phthalic anhydride, dissolved in 50 g dioxane, is added dropwise and the mixture is stirred with refluxing for three hours. Propionic anhydride is then added dropwise and the mixture is stirred with refluxing for 13 hours. The product is precipitated from acetone, washed with acetone and dried in a vacuum.

In the table below, the amounts used, the yield and the softening temperature of the product are indicated.

| n-stearyl isocyanate g/mol | Phthalic anhydride g/mol | Propionic anhydride g/mol | Yield (g) | ST (° C.) |
|---|---|---|---|---|
| 7.3/0.025 | 7.4/0.05 | 6.5/0.05 | 11.8 | 180 |

Example 4

5.3 g (0.025 mol) of dried hydroxypropylcellulose MS 0.9 is refluxed in 200 g dioxane with 0.2 ml 1,8-diazabicyclo [4.5.0]undec-7-ene for 30 minutes. The isocyanate is then added dropwise and the mixture is stirred with refluxing for two hours. Thereafter, propionic anhydride, dissolved in 50 g dioxane, is added dropwise and the mixture is stirred with refluxing for 13 hours. The product is precipitated from n-hexane, washed with hexane and dried in a vacuum.

In the table below, the amounts used, the yield, the softening temperature and the degree of substitution, detected by $^{13}$C-NMR spectroscopy, of the product are indicated.

|  | Propionic anhydride g/mol | Yield (g) | DS Carbamate | DS Propionate | ST (° C.) |
|---|---|---|---|---|---|
| n-butyl isocyanate g/mol |  |  |  |  |  |
| 4a  2.4/0.025 | 6.5/0.05 | 6.9 | 1.0 | 1.1 | 200 |
| n-stearyl isocyanate g/mol |  |  |  |  |  |
| 4b  3.6/0.0125 | 6.5/0.05 | 7.3 | 0.2 | 1.2 | 210 |
| 4c  7.3/0.025 | 6.5/0.05 | 11.5 | 0.5 | 0.6 | 180 |
| 4d  3.6/0.0125 | 3.3/0.025 | 10.1 | total 1.2 |  | 195 |
| 4e  7.3/0.025 | 3.3/0.025 | 12.6 | total 1.0 |  | 180 |

Mechanical testing according to DIN 53 457 and ISO 180-1C results in the following mechanical properties:

(The values indicated are the equivalents of the isocyanates and anhydrides used in the reaction based on the repeat unit of the HPC)

|  | n-stearyl isocyanate equivalents | Propionic anhydride equivalents | ST (° C.) | Modulus of elasticity (MPa) | Tensile strength (MPa) | Elongation at break (%) |
|---|---|---|---|---|---|---|
| 4b | 0.5 | 2 | 210 | 570 | 12.2 | 8.3 |
| 4c | 1 | 2 | 180 | 650 | 15.4 | 6.6 |
| 4d | 0.5 | 1 | 195 | 2340 | 19.5 | 0.9 |
| 4e | 1 | 1 | 180 | 1240 | 22 | 2.7 |

Example 5

5.3 g (0.025 mol) of dried hydroxypropylcellulose MS 0.9 is refluxed in 200 g dioxane with 0.2 ml 1,8-diazabicyclo [4.5.0]undec-7-ene for 30 minutes. The isocyanate is then added dropwise and the mixture is stirred with refluxing for two hours. Thereafter, butyric anhydride, dissolved in 50 g dioxane, is added dropwise and the mixture is stirred with refluxing for 13 hours. The product is precipitated from water pH 8–9, drawn off, then washed again with water pH 9 and dried in air.

In the table below, the amounts used, the yield, the softening temperature and the degree of substitution, detected by $^{13}$C-NMR spectroscopy, of the product are indicated.

|  | n-stearyl isocyanate g/mol | Butyric anhydride g/mol | Yield (g) | DS Carbamate | DS Butyrate | ST (° C.) |
|---|---|---|---|---|---|---|
| 5a | 3.6/0.0125 | 7.9/0.05 | 11.54 | 0.2 | 1.5 | 150 |
| 5b | 3.6/0.0125 | 3.9/0.025 | 9.9 | 0.1 | 1.0 | 170 |
| 5c | 7.3/0.025 | 3.9/0.025 | 13.5 | 0.4 | 0.6 | 180 |
| 5d | 7.3/0.025 | 7.9/0.05 | 15.0 | 0.5 | 1.7 | 150 |

Example 6

26.7 g (0.125 mol) of dried hydroxypropylcellulose MS 0.9 is refluxed in 750 g dioxane with 1 ml 1,8-diazabicyclo [4.5.0]undec-7-ene for 30 minutes. The isocyanate is then added dropwise and the mixture is stirred with refluxing for two hours. Thereafter, butyric anhydride, dissolved in 50 g dioxane, is added dropwise and the mixture is stirred with refluxing for 9 hours. The product is precipitated from water pH 8–9 (NH4OH), drawn off, then washed again with water pH 9 and dried in air.

In the table below, the amounts used, the yield, the softening temperature and the degree of substitution, detected by $^{13}$C-NMR spectroscopy, of the product are indicated.

|  | n-stearyl isocyanate g/mol | Butyric anhydride g/mol | Yield (g) | DS Carbamate | DS Butyrate | ST (° C.) |
|---|---|---|---|---|---|---|
| 6a | 18.4/0.0625 | 39.5/0.25 | 76 | 0.5 | 1.2 | 165 |
| 6b | 18.4/0.0625 | 59.2/0.375 | 78 | 0.5 | 1.4 | 165 |
| 6c | 36.8/0.125 | 19.7/0.125 | 68 | 0.2 | 0.3 | 230 |
| 6d | 36.8/0.125 | 39.5/0.250 | 71 | 0.3 | 0.5 | 190 |
| 6e | 36.8/0.125 | 59.2/0.375 | 57 | 0.4 | 1.3 | 180 |

Example 7

When tested mechanically according to DIN 53 457 and ISO 180-1C, the materials described in Examples 5 and 6 exhibit the following properties:

(The values indicated are the equivalents of the isocyanates and anhydrides used in the reaction based on the repeat unit of the HPC)

|  | n-stearyl isocyanate equivalents | Butyric anhydride equivalents | ST (° C.) | Modulus of elasticity (MPa) | Tensile strength (MPa) | Elongation at break (%) |
|---|---|---|---|---|---|---|
| 7a | 0.5 | 1 | 170 | 300 | 6.6 | 4.9 |
| 7b | 0.5 | 2 | 150 | 430 | 11.1 | 7.9 |
| 7c | 0.5 | 2 | 165 | 244 | 11.5 | 10.0 |
| 7d | 0.5 | 3 | 165 | 104 | 10.0 | 35.5 |
| 7e | 1 | 1 | 180 | 600 | 12.5 | 4.4 |
| 7f | 1 | 1 | 230 | 405 | 8.0 | 2.9 |
| 7g | 1 | 2 | 190 | 316 | 9.4 | 7.7 |
| 7h | 1 | 3 | 180 | 279 | 14.3 | 33.2 |

Comparative Examples

The molar amounts given below for polymers and oligomers are based on the average molecular weights of the ideal repeat units.

Comparative Reaction 1

5.3 g (0.025 mol) of dried hydroxypropylcellulose MS 0.9 is refluxed in 200 g dioxane with 0.2 ml 1,8-diazabicyclo [4.5.0]undec-7-ene for 30 minutes. Thereafter, the acetic anhydride, dissolved in 50 g dioxane, is added dropwise and the mixture is stirred with refluxing for 13 hours. The product is precipitated from n-hexane, washed with hexane and dried in a vacuum.

In the table below, the amounts used, the yield, the softening temperature and the degree of substitution, detected by $^{13}$C-NMR spectroscopy, of the product are indicated.

| Acetic anhydride (g)/mol | Yield (g) | DS Acetate | ST (° C.) |
|---|---|---|---|
| 5.1/0.05 | 6.8 | 1.3 | 220 highly viscous opaque |

Comparative Reaction 2

5.3 g (0.025 mol) of dried hydroxypropylcellulose MS 0.9 is refluxed in 200 g dioxane with 0.2 ml 1,8-diazabicyclo[4.5.0]undec-7-ene for 30 minutes. Thereafter, propionic anhydride, dissolved in 50 g dioxane, is added dropwise and the mixture is stirred with refluxing for 13 hours. The product is precipitated from n-hexane, washed with hexane and dried in a vacuum.

In the table below, the amounts used, the yield, the softening temperature and the degree of substitution, detected by $^{13}$C-NMR spectroscopy, of the product are indicated.

| Propionic anhydride g/mol | Yield (g) | DS Propionate | ST (° C.) |
|---|---|---|---|
| 6.5/0.05 | 5.6 | 1.4 | 220 highly viscous opaque |

Comparative Reaction 3

5.3 g (0.025 mol) of dried hydroxypropylcellulose MS 0.9 is refluxed in 200 g dioxane with 0.2 ml 1,8-diazabicyclo[4.5.0]undec-7-ene for 30 minutes. Thereafter, butyric anhydride, dissolved in 50 g dioxane, is added dropwise and the mixture is stirred with refluxing for 13 hours. The product is precipitated from water pH 8–9, drawn off, then washed again with water pH 9 and dried in air.

In the table below, the amounts used, the yield, the softening temperature and the degree of substitution, detected by $^{13}$C-NMR spectroscopy, of the product are indicated.

| Butyric anhydride g/mol | Yield (g) | DS Butyrate | ST (° C.) |
|---|---|---|---|
| 7.9/0.05 | 7.7 | 1.5 | 180 highly viscous opaque |
| 3.9/0.025 | 5.8 | 0.9 | 240 decomposition |

Comparative Reaction 4

7.1 g (0.025 mol) of plastic acetate DS 2.0 (acetate 53%) is refluxed with 1,8-diazabicyclo[4.5.0]undec-7-ene for 30 minutes in 200 g dioxane. The isocyanate, dissolved in 50 g dioxane, is then added dropwise and the mixture is stirred with refluxing for two hours. The product is precipitated from n-hexane, washed with hexane and dried.

In the table below, the amounts used, the yield, the softening temperature and the degree of substitution, detected by $^{13}$C-NMR spectroscopy, of the product are indicated.

| n-stearyl isocyanate g/mol | Yield (g) | DS Carbamate | ST (° C.) |
|---|---|---|---|
| 3.7/0.0125 | 10.4 | 0.5 | 220 decomposition |

Comparative Reaction 5

7.1 g (0.025 mol) of plastic acetate DS 2.0 (acetate 53%) is refluxed with 1,8-diazabicyclo[4.5.0]undec-7-ene for 30 minutes in 200 g DMAc at 130° C. The isocyanate, dissolved in 50 g DMAc, is then added dropwise and the mixture is stirred for two hours. The product is precipitated from n-hexane, washed with hexane and dried.

In the table below, the amounts used, the yield, the softening temperature and the degree of substitution, detected by $^{13}$C-NMR spectroscopy, of the product are indicated.

| n-stearyl isocyanate g/mol | Yield (g) | DS Carbamate | ST (° C.) |
|---|---|---|---|
| 3.7/0.0125 | 7.3 | 0.29 | 210 decomposition |

What is claimed is:

1. A thermoplastic polysaccharide-ether/carbamate/ester derivative of the general structure,

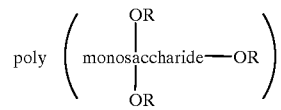

wherein R is H or a substituent having a structure selected from, $$R=\text{—A—B,} \qquad (i)$$

$$R=\text{—A—C,} \qquad (ii)$$

$$R=\text{—B,} \qquad (iii)$$

$$R=\text{—C, and} \qquad (iv)$$

$$R=\text{A—H} \qquad (v)$$

in which A is a linear polyether chain of the following structure:

$$A=(\text{—D—O—})_n$$

in which D denotes a linear aliphatic branched or unbranched chain of 2 to 12 C atoms, O represent an oxygen atom and n is a number equal to or greater than 1, and B represents an N-substituted carbamoyl of the structure

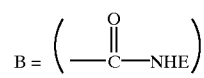

in which E denotes a linear or branched aliphatic chain of 1 to 18 carbon atoms, and C represents an alkanoyl of the structure

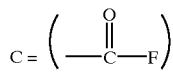

in which F denotes a linear aliphatic, saturated or unsaturated,
branched or unbranched chain of 2 to 22 C atoms, provided that said thermoplastic polysaccharide-ether/carbamate/ester derivative contains substituent R structures (iii), (iv) and at least one of (i) and (ii).

2. A thermoplastic molding composition comprising the polysaccharide-ether/carbamate/ester derivative of claim 1, and at least one conventional additive selected from the group consisting of plasticizers, impact resistance modifiers, flame retardants, anti-oxidants, UV protectors, nucleating agents and fillers.

3. A mixture comprising:
X) the thermoplastic polysaccharide-ether/carbamate/ester derivative of claim 1; and
Y) a low molecular weight, unbranched or branched, symmetrical or asymmetrical, aliphatic dialkyl urea derivative having chain lengths of from 1 to 20 carbon atoms,
wherein the molar ratio of X to Y is represented by the formula, $$0.001 < Y/(X+Y) < 0.3.$$

4. The thermoplastic polysaccharide-ether/carbamate/ester derivative of claim 1 wherein said thermoplastic polysaccharide-ether/carbamate/ester derivative is formed from the reaction of a) isocyanates or blocked isocyanates, and b) activated carboxylic acid derivatives with c) said polysaccharide ether, the thermoplastic polysaccharide-ether/carbamate/ester derivative having an overall degree of substitution (based on the anhydroglucose unit) of DS=0.3 to 3.0.

5. The thermoplastic polysaccharide-ether/carbamate/ester derivative of claim 4 having an overall degree of substitution of DS=0.6 to 2.8.

6. The thermoplastic polysaccharide-ether/carbamate/ester derivative of claim 1 wherein said polysaccharide ether is a cellulose ether having an average degree of substitution (MS) of 0.1 to 5, and said thermoplastic polysaccharide-ether/carbamate/ester derivative is a cellulose-ether/carbamate/ester derivative.

7. A method of producing a composition comprising the thermoplastic polysaccharide-ether/carbamate/ester derivative of claim 1 and a low molecular weight urea derivative, said method comprising, (a) providing a first mixture comprising said polysaccharide ether, a catalyst, a solvent and water, said polysaccharide ether being insoluble in said solvent, (b) forming a second mixture of a polysaccharide-ether/carbamate intermediate, said low molecular weight urea derivative and said solvent by adding an isocyanate to said first mixture, said polysaccharide-ether/carbamate intermediate and said low molecular weight urea derivative being soluble in said solvent, (c) adding an activated carboxylic acid derivative to said second mixture, thereby forming said composition comprising the polysaccharide-ether/carbamate/ester derivative of claim 1 and said low molecular weight urea derivative, and (d) optionally isolating said composition comprising the polysaccharide-ether/carbamate/ester derivative of claim 1 and said low molecular weight urea derivative.

* * * * *